Apr. 17, 1923.
H. S. GUTSELL
AUTOMOBILE BUFFER
Filed June 15, 1922
1,451,874
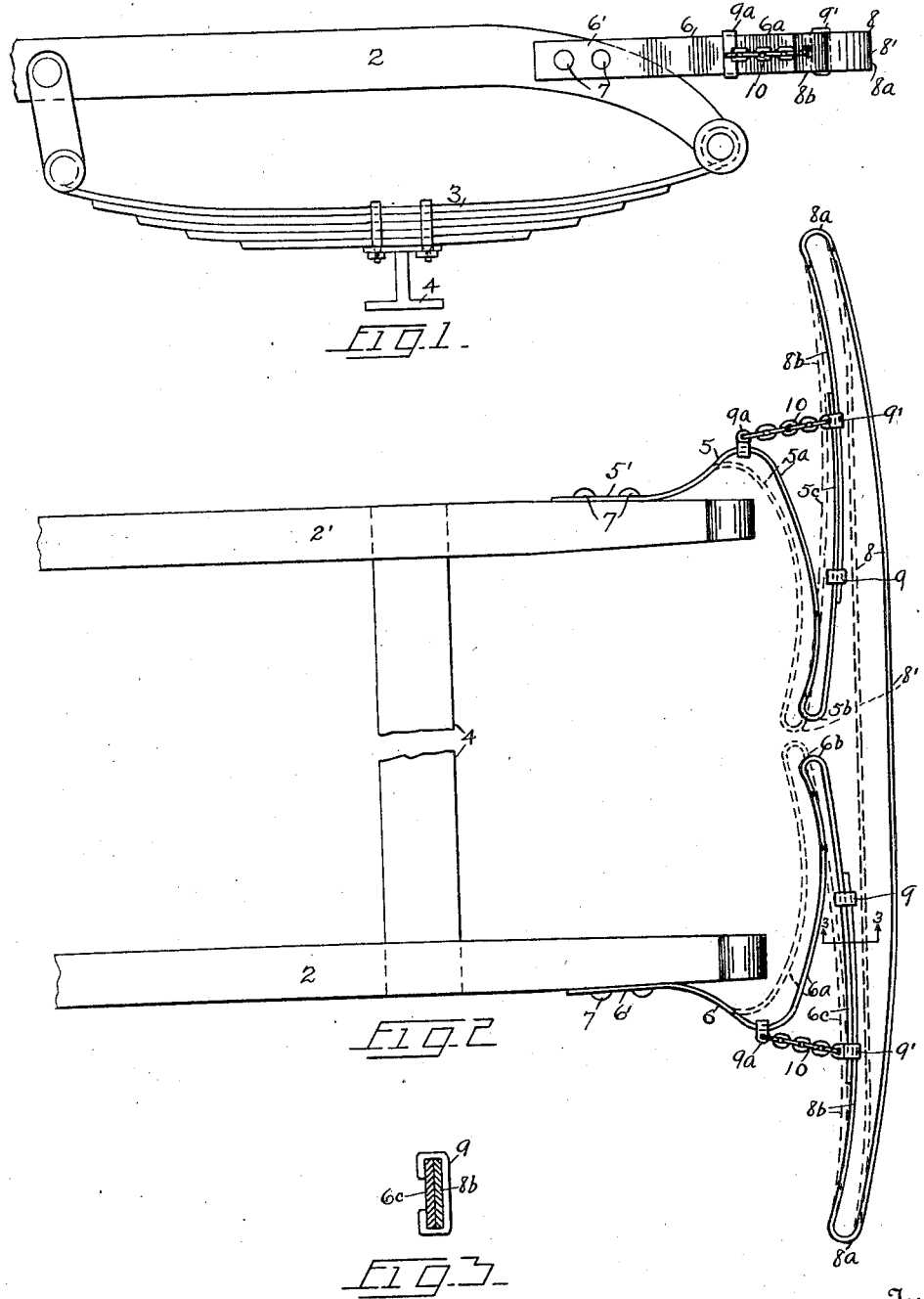

Patented Apr. 17, 1923.

1,451,874

UNITED STATES PATENT OFFICE.

HIRAM S. GUTSELL, OF ITHACA, NEW YORK.

AUTOMOBILE BUFFER.

Application filed June 15, 1922. Serial No. 568,555.

*To all whom it may concern:*

Be it known that I, HIRAM S. GUTSELL, a citizen of the United States, residing at Ithaca, in the county of Tompkins and State of New York, have invented certain new and useful Improvements in Automobile Buffers, of which the following is a specification.

This invention relates to buffers for automobiles and other vehicles, and has for its object to provide a device of the class, to be supported by the opposite side members of the chassis which usually project beyond the body of the vehicle. A further object is to provide novel, simple and effective cushion means, for absorbing the impacts and shocks of collisions, the said means consisting of a plurality of partially folded and partially overlapping connected members, which are normally held extended by their own tension, and which yield and flex in a complementary manner whenever the vehicle collides with other objects. A further object is to provide a buffer of the class consisting of a main member, entirely constructed of spring metal, which extends across the front or rear of the vehicle and directly receives and partially absorbs the shocks, the said member being supported by similar spaced auxiliary springs, which are respectively supported by the opposite chassis members and which cooperate with the main spring for entirely absorbing the shock. And a further object is to provide means for limiting the flexing movements of the buffer members relatively to each other.

I attain these objects by the means set forth in the detailed description which follows, and as illustrated by the accompanying drawing, in which—

Figure 1 is a broken side elevation of the forward end of a vehicle chassis, to which my improvement is applied. Fig. 2 is a top plan view of the same; showing by full and dotted lines the idle and the operated positions of the buffer parts. And Fig. 3 is a vertical section taken on line 3—3 of Fig. 2; showing one of the means for clamping the overlapping ends of the main and auxiliary members.

In the drawing, 2—2' represents the usual spaced horizontal members of the chassis or frame of an automobile running gear, which are usually supported by the common elliptical leaf springs 3, the latter being mounted upon and supported by a cross bar or beam 4.

My improved buffer consists of the following parts: 5 and 6 represent similar irregularly formed springs, which are preferably made out of flat ribbon steel of suitable breadth and gage, the corresponding ends 5'—6' of said springs being perforated to receive bolts 7, by means of which the springs are rigidly secured to the forward ends of the chassis members 2—2'. From the bolt 7 the auxiliary members 5 and 6 extend forwardly, outwardly and then bend inwardly in a relatively broad curve $5^a$—$6^a$ towards the longitudinal center of the frame. The inner extremities of the members 5 and 6 approach close to each other (see Fig. 2) and each is then given a relatively short bend, as at $5^b$—$6^b$, and thence extend in opposite directions away from said longitudinal center for providing slight outwardly curved transverse arms $5^c$—$6^c$, whose ends project beyond the ends of the chassis members 2—2'. The springs 5 and 6 are intended to be alike as to shape and size and are preferably disposed in a common horizontal plane, and in line with the longitudinal axis of the chassis members, as best seen in Fig. 1. The members 5 and 6 have no direct connections, and are so fashioned and disposed that they do not contact with each other, whether they are in the idle or the operated positions, as shown by the full and dotted lines in Fig. 2. By this construction and arrangement, the members 5 and 6 may flex to the same or different extent when subjected to impacts or shocks.

8 represents the main buffer member, which is also preferably made from a continuous strip or ribbon of spring steel, which extends transversely across the front of the vehicle, directly in front of the members 5 and 6. The portion of the member 8, which directly receives the impacts or shocks of collisions, consists of a relatively long shallow outward curve 8', whose extremities are formed with relatively short bends $8^a$, and from these bends the end portions $8^b$ are folded substantially parallel to the body 8', in a manner to correspondingly overlap the arms $5^c$—$6^c$ of the auxiliary members. The parts $8^b$ and $5^c$—$6^c$ are then rigidly secured together, by means of clamps 9 and 9', one of which is shown enlarged in Fig. 3. By this construction and arrangement, the main buffer member 8 is entirely supported by the springs 5 and 6, and the clamps 9—9'. The member 8 is also preferably disposed in the same horizonal plane as the members 5 and 6 (see Fig. 1), and the whole buffer fixture is supported by the bolted ends 5'—6'. When the springs 5 and 6 are formed up, as shown, the arms 5ᶜ—6ᶜ tend to spring away from the portions 5ᵃ—6ᵃ, and in order to hold the said arms in a normal position relatively to the other part, as well as, to prevent the said arms and the member 8 they support, from vibrating in an unrestrained manner while the vehicle is in motion, I provide guy-chains 10 or other flexible ties, one end of which connects with the clamps 9', while their opposite ends connect in a similar manner with clamps 9ᵃ, which are carried by the oppositely bent portions 5ᵃ—6ᵃ. The chains 10 are preferably of equal length, and correspondingly positioned, and the length of the said chains is such that the tension of the springs 5 and 6 normally hold the chains taut and at the same time the said springs are held by the chains under such tension as to more effectively support the member 8 in case of collision. By this arrangement of the parts, a considerable range of flexing towards and away from the chassis is allowed for the arms 5ᶜ—6ᶜ, independently of the flexible portions 5ᵃ—6ᵃ. In practice, when the vehicle strikes an object lightly, the arms 5ᵃ—6ᵃ may be relied upon to absorb the greater part of the impact, while the member 8, and the portions 5ᶜ—6ᶜ, will be flexed to a less extent. When, however, the vehicle violently collides with another car or with some other solid object, the transversely arranged portions of the three principal members (5, 6 and 8) will all flex, as shown somewhat exaggerated, by the dotted lines in Fig. 2. The members 5, 6 and 8 are all shown constructed from substantially the same gage metal, and the strips or ribbons of the spring material are substantially the same breadth. By this arrangement all of said members afford substantially the same resilience and therefore offer practically the same resistance to the collision shocks, and when the several transversely disposed parts are properly proportioned, the strains of the shocks will be substantially equally distributed throughout the several buffer parts, as shown. However, I do not wish to be restricted to the use of the same gage of spring metal throughout the several members, and I claim the right to increase or decrease the gage of the spring metal, as well as to increase and decrease the gage and breadth of one member relatively to the other members and I also claim the right to apply my buffer reversed to the rear end of the chassis without departing from my invention.

Having thus described my invention, what I claim, is—

1. In a buffer for vehicles, the combination with the spaced chassis members, of the vehicle running gear, of a folded buffer member rigidly supported by each of said chassis members, said buffer members being bent inwardly towards the longitudinal center of the vehicle and then bent outwardly for forming similar arms, and a main buffer member disposed across the front of the vehicle and having inwardly folded arms which overlap and engage the arms of the other buffer members.

2. In a buffer for vehicles, the combination with the spaced chassis members of the running gear, of a main buffer member whose body is formed in a shallow curve extending across the front of the vehicle in a horizontal plane, and similar folded buffer springs supported respectively by the chassis members and resiliently supporting said main buffer member in spaced relation to the ends of the chassis members, said springs adapted to flex in a supplementary manner whenever said main member encounters another vehicle or object, and counters another vehicle or object, and means for limiting the forward flexing of said springs during their recoil from the shocks.

3. In a buffer for vehicles, the combination with the chassis members of the vehicle, of a main buffer spring extending transversely across the front of the vehicle, the ends of the main buffer spring being folded inwardly towards the longitudinal center of the vehicle, and similar supplementary springs rigidly secured to the chassis member and folded inwardly and outwardly in the space between said members and the main buffer spring, said supplementary springs and said main springs being disposed in a common horizontal plane and being held extended forwardly from the ends of the chassis members by their own tension.

4. In a buffer for vehicles, the combination with the spaced chassis members of the vehicle running gear, of a folded buffer member rigidly supported by each of said chassis members, said buffer members being bent inwardly towards the longitudinal center of the vehicle and then bent outwardly for forming similar arms, a main buffer member disposed across the front of the vehicle, said member being folded upon itself and its inner portion overlapping and engaging the arms of the other buffer members, and a plurality of clamps for rigidly connecting the corresponding arms of the said springs.

In testimony whereof I affix my signature.

HIRAM S. GUTSELL.